July 2, 1968  W. J. HILL ETAL  3,390,789
COIL HANDLING APPARATUS
Filed Jan. 9, 1967  8 Sheets-Sheet 1

INVENTORS
William J. Hill
William R. Wynn
BY Roger Kinnicutt, Jr.

*Russell, Chittick & Pfund*

ATTORNEYS

INVENTORS
William J. Hill
BY William R. Wynn
Roger Kinnicutt, Jr.

Russell, Chittick & Pfund
ATTORNEYS

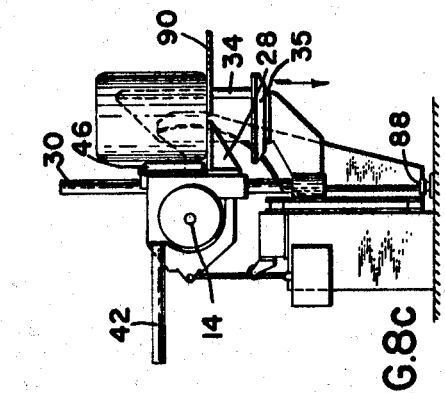
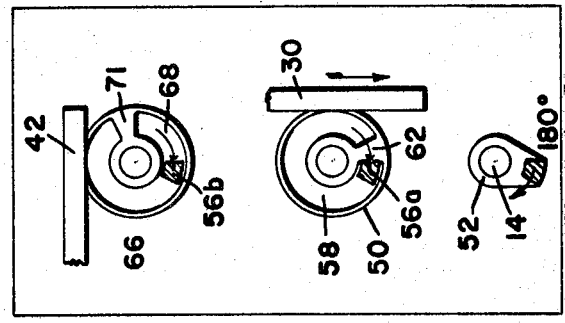
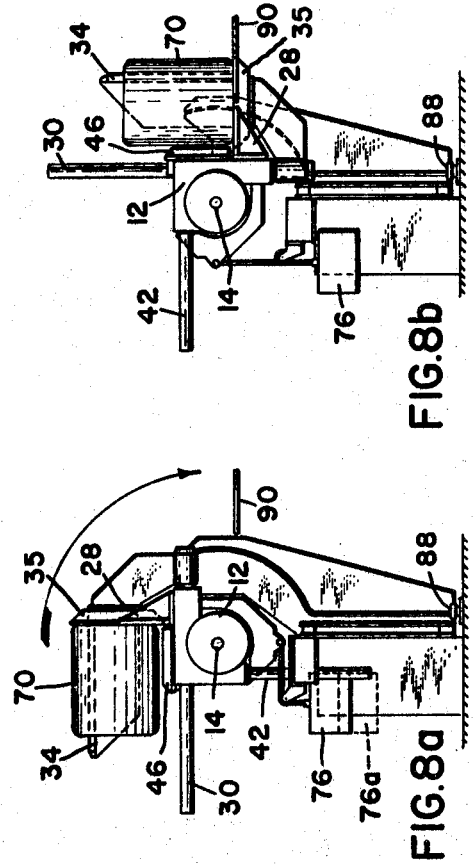
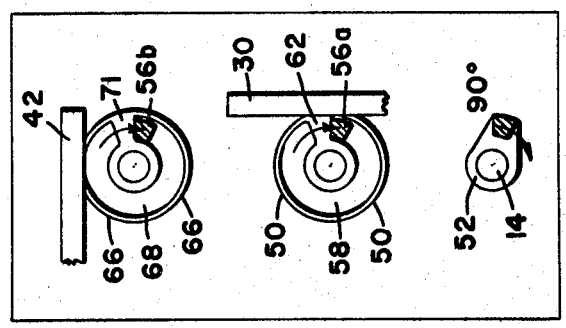
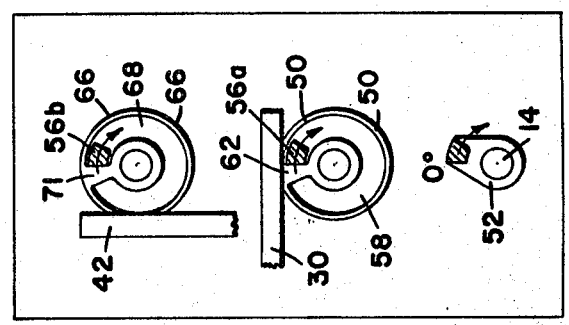

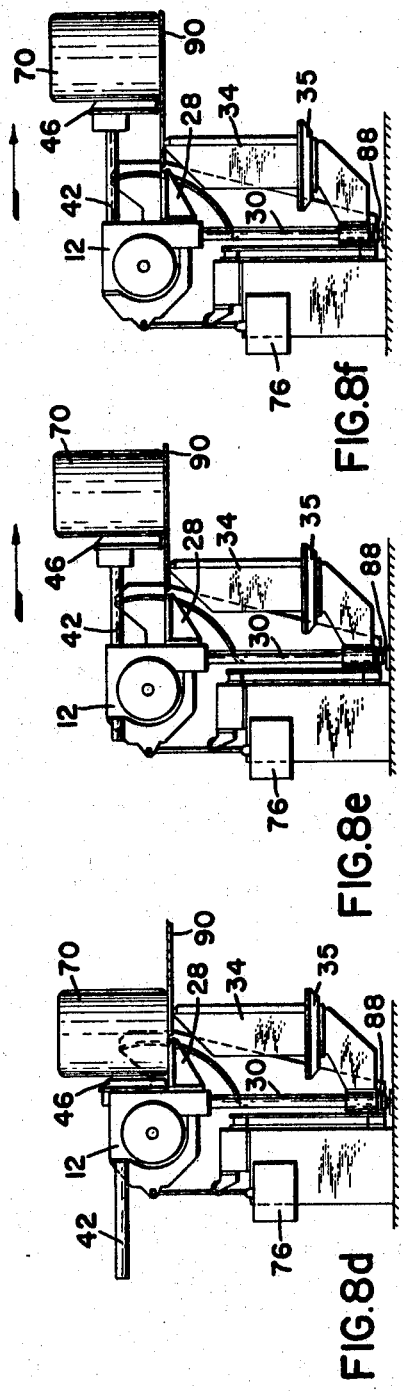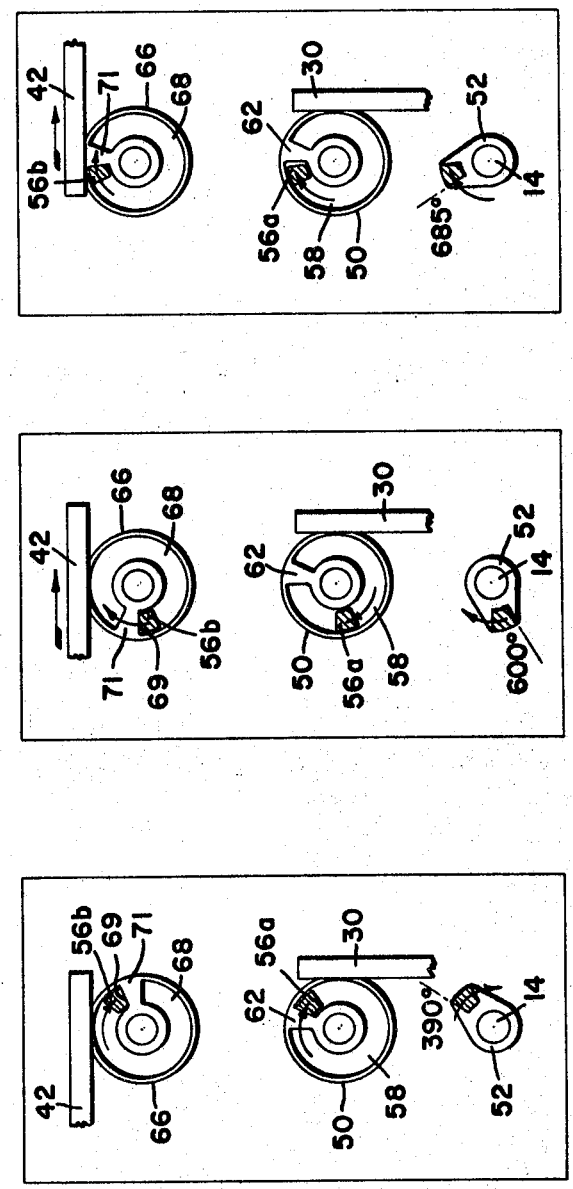

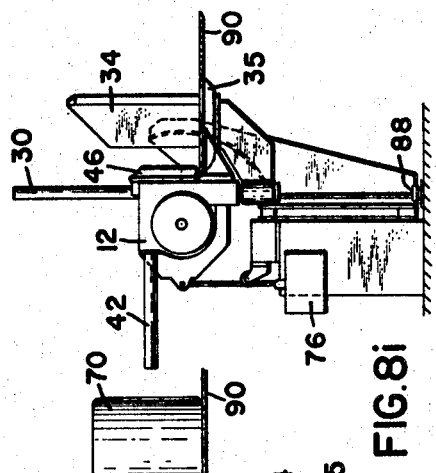
FIG. 8i
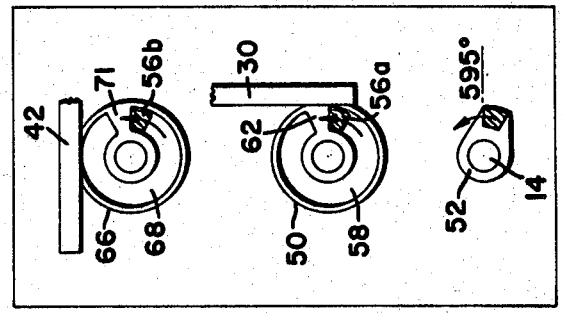
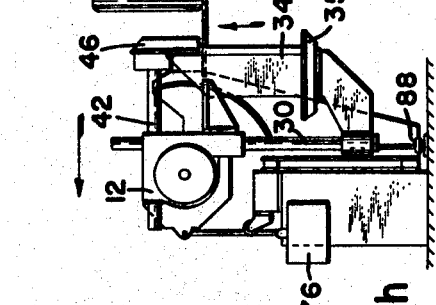
FIG. 8h
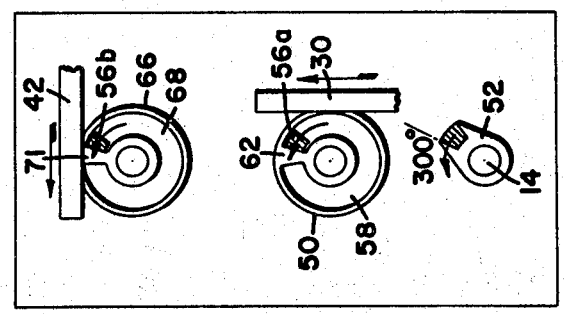
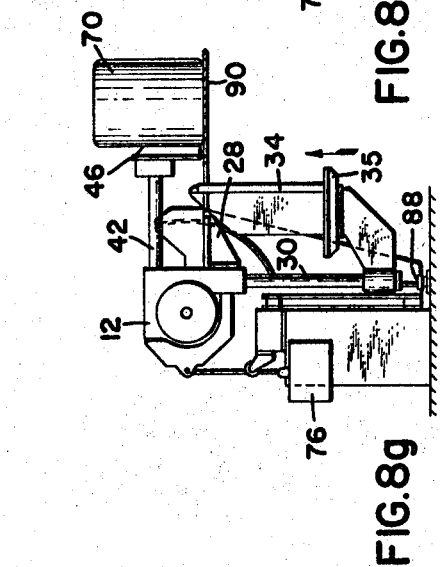
FIG. 8g
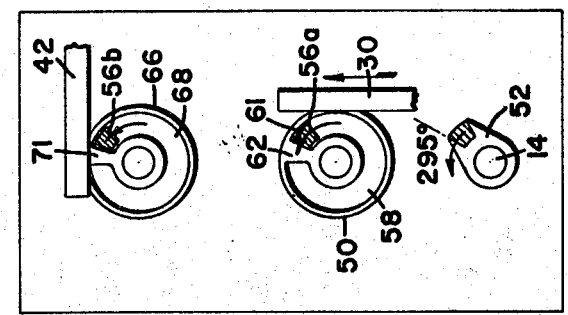
INVENTORS
William J. Hill
William R. Wynn
Roger Kinnicutt, Jr.
*Russell, Chittick & Pfund*
ATTORNEYS

# United States Patent Office 3,390,789
Patented July 2, 1968

3,390,789
COIL HANDLING APPARATUS
William J. Hill and William R. Wynn, Holden, and Roger Kinnicutt, Jr., Worcester, Mass., assignors to Morgan Construction Company, Worcester, Mass., a corporation of Massachusetts
Filed Jan. 9, 1967, Ser. No. 608,163
8 Claims. (Cl. 214—1)

ABSTRACT OF THE DISCLOSURE

An apparatus for transferring substantially cylindrical coils from a horizontally disposed position at one location to a vertically disposed position at a second laterally adjacent location.

Background of the invention

This invention relates to material handling apparatus and more particularly to a device which receives a horizontally disposed substantially cylindrical coil at one location, rotates the coil through an angle of approximately 90° to a vertically disposed intermediate position (a step commonly referred to in the rolling mill art as "down-ending"), and thereafter transfers the vertical coil to a second laterally adjacent location.

Prior art devices of this type have generally failed to satisfactorily meet the requirements of those skilled in the art, primarily because such devices include a number of separately powered components, each of which is relied upon to sequentially perform a different function. The components are usually hydraulically actuated, a factor which contributes substantially to the initial cost of each device. In addition, the controls needed to insure proper sequential operation of each separately operable component are also expensive and complicated, the latter feature frequently causing serious maintenance problems.

Summary of the invention

In the present invention, all of the components required to achieve both down-ending and lateral transfer of the coil are carried by a single housing assembly which is rotatably mounted on a horizontally disposed driven shaft. The housing assembly and the components which are movable relative to the housing assembly are all mechanically connected to the driven shaft by gears in a manner making their sequential operation controlled by and dependent on rotation of the shaft. This arrangement thus avoids the necessity of employing a complicated and expensive control system and in addition, greatly reduces maintenance problems. Moreover, the driven shaft may be powered by a single motor, a factor which aids in further minimizing equipment costs.

In view of the foregoing, it is a general object of the present invention to provide an improved and simplified coil handling apparatus which is capable of both down-ending and laterally transferring coils.

Another object of the present invention is to provide an apparatus of the above-described type wherein the sequential operation of each of its components is controlled in responsee to rotation of single drive shaft.

A further object of the present invention is to provide a coil handling apparatus for both down-ending and laterally transferring coils, the said apparatus being driven by a single power source.

These and other objects and advantages of the present invention will become more apparent from the following detailed description taken in conjunction with the accompanying drawings.

Description of a preferred embodiment

Figure 1:
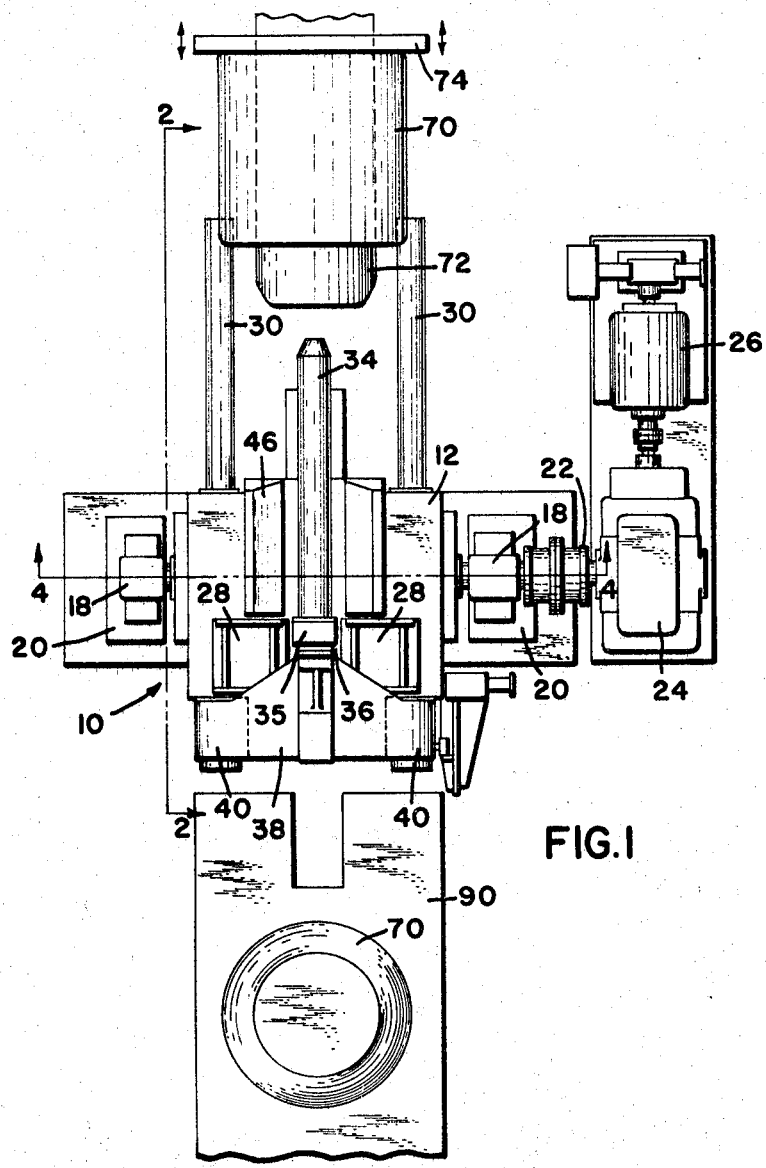
FIG. 1 is a plan view of a preferred embodiment of the apparatus in its initial coil receiving position.
Figure 2:
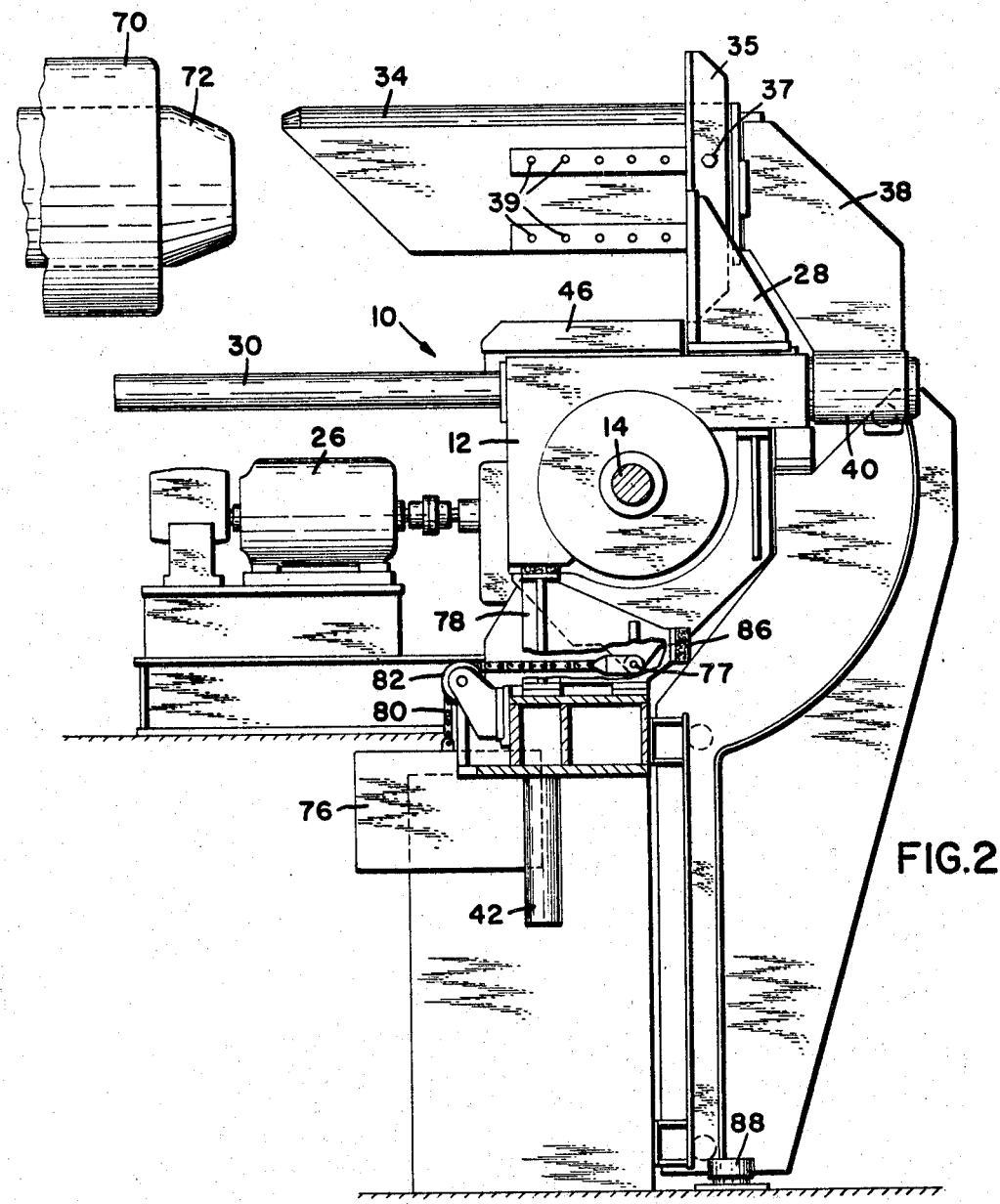
FIG. 2 is a sectional view on an enlarged scale taken along line 2—2 of FIG. 1.
Figure 3:
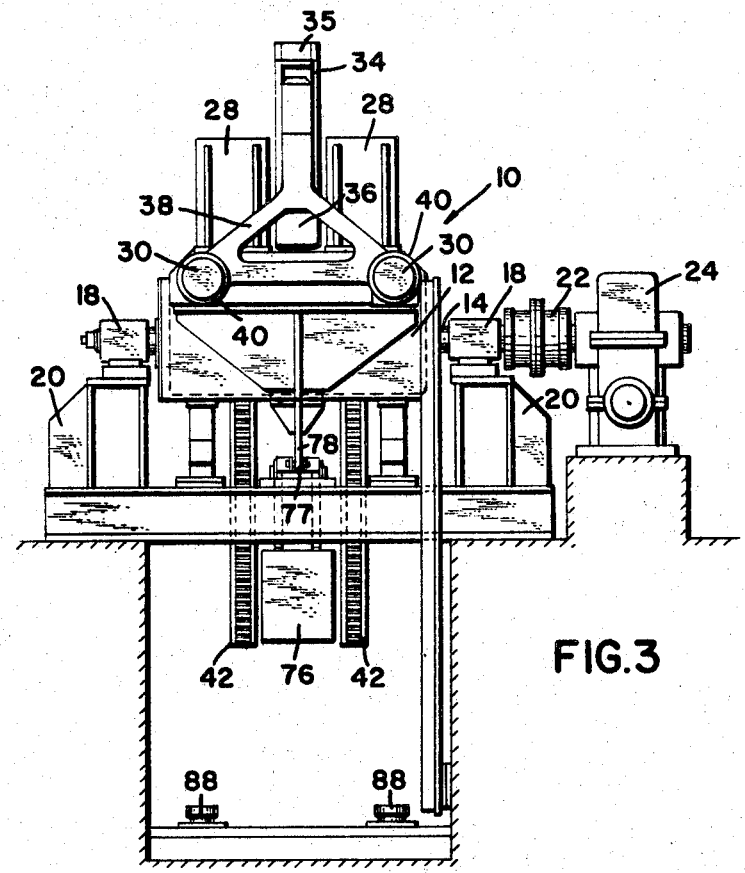
FIG. 3 is an end view of the apparatus looking towards the coil receiving station.

Referring initially to FIGS. 1-3 wherein are best shown general features of a preferred embodiment of the invention, a coil handling apparatus is generally indicated by the reference numeral 10. The apparatus includes a basic housing assembly 12 which is rotatably supported on a horizontally extending shaft 14. The shaft extends through the housing assembly and is journalled in the housing side walls 15a and 15b (see FIG. 4) by means of conventional sleeve bearings 16. Shaft 14 is rotatably supported exterior of housing assembly 12 by means of bearings 18, the latter being mounted on stationary spaced abutments 20. Shaft 14 is connected by means of a coupling 22 to a worm-helical gear reducer 24, the latter in turn being driven by means of a reversible motor 26.

Housing assembly 12 is provided with a fixed coil supporting platform 28 which extends vertically therefrom when the housing is in the position shown in FIGS. 1-3. A first pair of guide rods 30 extend laterally through housing assembly 12 in a direction transverse to the rotational axis of driven shaft 14. Sleeve bearings 32a and 32b (see FIG. 6) permit axial movement of the rods 30 relative to the housing assembly 12. A coil receiving arm member 34 extends through a slot 36 in fixed support member 28 in a direction parallel to the guide rods 30. One end of arm member 34 is connected to the guide rods 30 by means of an intermediate A-shaped frame 38 and collars 40, thus making the combination of guide rods 30 and coil receiving arm member 34 movable as a sub-assembly relative to the basic housing assembly 12 in a direction transverse to the rotational axis of driven shaft 14.

Figure 5:
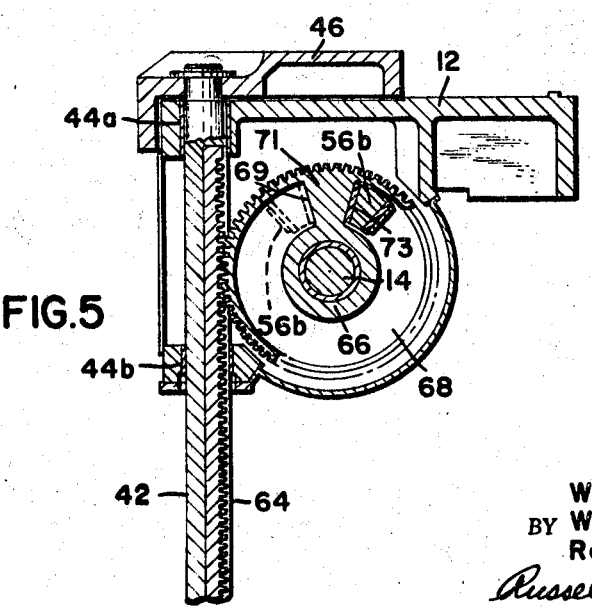
FIGS. 5 and 6 are sectional views taken along lines 5—5 and 6—6 of FIG. 4, with the drive lugs returned 180° in a counterclockwise direction.

Housing assembly 12 is further provided with a second set of guide rods 42 which extend in a direction transverse to both the rotational axis of driven shaft 14 and the longitudinal axes of guide rods 30. The guide rods 42, which are connected at one end exterior of the housing assembly 12 to a pusher plate 46, are also supported for slidable axial movement by means of sleeve bearings 44a and 44b (see FIG. 5) in the housing walls.

Figure 4:
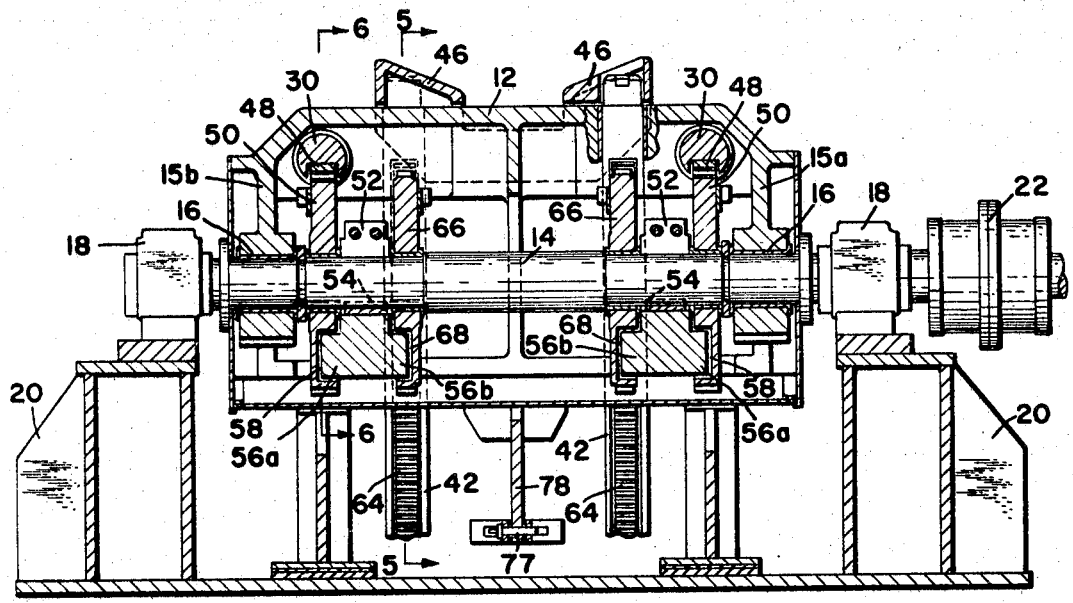
FIG. 4 is a sectional view on an enlarged scale taken along line 4—4 of FIG. 1 with the housing assembly held stationary and with the driven shaft rotated through an angle of 180° in order to provide a better illustration of the relationship between the drive lugs and their adjacent pinions.
Figure 6:
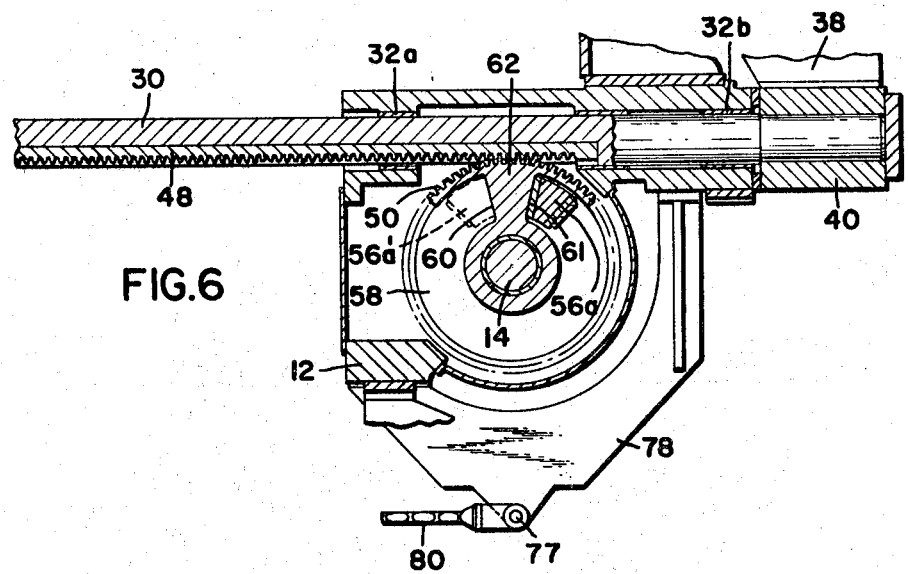

As can be best seen by further reference to FIGS. 4 and 6, the guide rods 30 are each provided along one side with racks 48, the latter being in meshed relationship with pinions 50 rotatably carried by driven shaft 14. Drive members 52 are keyed as at 54 to the driven shaft 14 at points adjacent each of the pinions 50. The drive members 52 are each provided with oppositely disposed laterally extending drive lugs 56a and 56b. Drive lugs 56a protrude into arcurate grooves 58 in the adjacent sides of pinions. The grooves 58 are continuous except for radially extending webs 62. With this arrangement, a positive drive connection in a clockwise direction will be established between shaft 14 and pinions 50 only when the drive lugs 56a have traveled around the arcuate grooves 58 to positions as indicated in dotted line at 56a' (see FIG. 6). At this point, further clockwise rotation of shaft 14 will result in corresponding clockwise rotation of the pinions 50 and axial movement of guide rods 30 due to the meshing of the pinions with racks 48. By the same token, rotation of shaft 14 in the opposite or counterclockwise direction will cause the pinions to be correspondingly rotated only when the drive lugs 56a have returned to the position shown in FIG. 6 in contact with the opposite faces 61 of pinion keys 62.

A similar arrangement is provided for establishing a drive connection between shaft 14 and the second set of guide rods 42 connected to pusher plate 46. More particularly, as can be best seen by a combined reference to FIGS. 4 and 5, the guide rods 42 are each provided with racks 64 in meshed relationship with a second set of pinions 66 rotatably mounted on driven shaft 14. The pinions 66 are again each provided with arcuate grooves 68 into which protrude the oppositely disposed laterally extending lugs 56b on the adjacent drive members 52. When shaft 14 is driven in a clockwise direction, a drive connection is not established between it and the guide rods 42 until lugs 56b have travelled around arcuate grooves 68 to positions (indicated in dotted line in FIG. 5 at 56b') in contact with faces 69 on radially extending pinion webs 71, at which point further clockwise rotation of shaft 14 will result in the pinions 66 being driven in a corresponding clockwise direction to extend guide rods 42. Subsequent retraction of the guide rods 42 will begin when shaft 14 has been rotated in a counterclockwise direction to return lugs 56b to positions contacting the opposite faces 73 on the pinion webs 71.

As can be best seen in FIGS. 1 and 2, when in the coil receiving position, arm member 34 is aligned with an adjacent horizontally disposed mandrel member 72 which supports the coils 70 prior to their being transferred onto the coil handling apparatus 10. Any conventional means may be employed to transfer the coils from mandrel 72 onto arm 34, such as for example a pusher plate 74. A collar 35 is attached to arm member 34 by means of bolts 37 extending through holes 39. Collar 35 may be adjusted along arms 34 by selecting any two laterally aligned holes 39 so as to make the distance between the end of arm 34 and the collar approximately equal to the weight of the coils being handled.

Operation of the apparatus through one complete coil handling cycle will now be described with further reference to the schematic illustrations provided by FIGS. 8A–8I. As shown in FIG. 8A, the apparatus is in the initial coil receiving position (as already described in connection with FIGS. 1–3) with the coil receiving arm member 34 extending horizontally in a lateral direction and with a coil 70 transferred to an axially supported position thereon in contact with collar 35. When in this initial coil receiving position, housing assembly 12 exhibits a tendency to rotate in a clockwise direction about shaft 14 because of a torque exerted thereon by counterweight 76, the latter being connected as at 77 (see FIGS. 2 and 6) to a plate 78 depending from the housing assembly by means of a chain 80 running over sheaves 82. However, because the first and second pairs of guide rods 30 and 42 each have racks 48 and 64 which mesh with the pinions 50 and 66, and because rotation of the pinions in a clockwise direction is prevented by the pinion webs 62 and 71 being held by the lugs 56a and 56b of drive members 52, the latter in turn being keyed to shaft 14, rotation of the housing assembly 12 in a clockwise direction must necessarily await clockwise rotation of shaft 14 in response to energization of motor 26.

Once a coil 70 has been transferred to an axially supported position on horizontally diposed arm member 34, motor 26 is energized to drive shaft 14 in a clockwise direction. Initially, through approximately the first 45° of the shaft rotation, corresponding rotation of housing assembly 12 is caused by a moment being exerted by the counterweight 76 falling to a position 76a (see FIG. 8A). During the second 45° of shaft rotation, the combined weight of housing assembly 12 and coil 70 becomes effective to create a continuing torque which is slightly greater than that exerted by the counterweight, the result being that the counterweight is elevated back to its original position (FIG. 8B). Thus, during the first 90° of clockwise shaft rotation (from FIG. 8A to FIG. 8B) the pinion webs 62 and 71 follow the rotating lugs 56a and 56b as the housing assembly rotates first under the influence of a moment created by counterweight 76 and then by a continuing moment created by its own weight to which is added the weight of coil 70.

Figure 7:
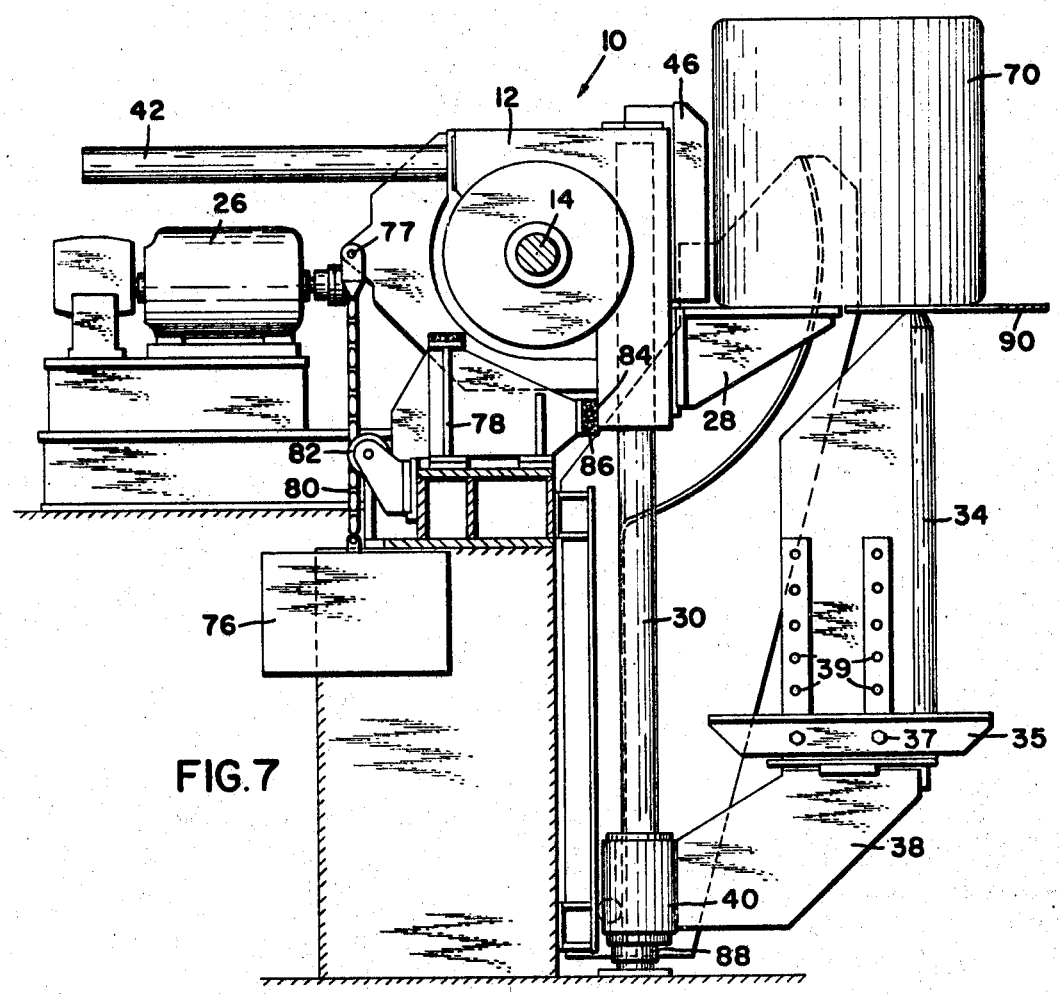
FIG. 7 is a sectional view similar to FIG. 2, showing the housing assembly rotated through an angle of 90° and with the coil receiving arm member downwardly retracted; and, FIGS. 8A-8I are schematic illustrations showing the apparatus operating through one complete cycle.

After 90° of rotation in the clockwise direction, further rotation of housing assembly 12 is prevented by its coming into contact as at 84 (see FIG. 7) with padded stationary bumpers 86. The guide rods 30 and arm member 34 now extend upwardly with the coil 70 in an intermediate vertically disposed position at rest on the now horizontally disposed support platform 28 and the laterally adjacent horizontally aligned support surface 90. In addition, the guide rods 42 to which the pusher plate 46 is attached are now horizontally disposed.

As shaft 14 continues to rotate in a clockwise direction (see FIG. 8C), pinions 50 will also continue to rotate in the same direction under the weight of arm member 34 and its associated components acting through the racks 48 on guide rods 30 and the teeth on the pinions themselves. The rate at which arm member 34 is lowered will depend on the speed at which shaft 14 is rotated, simply because the pinion webs 62 will remain in contact and follow along with the lugs 56a on the rotating drive members 52. Thus, the relative positions of lugs 56a within pinion grooves 58 will remain unchanged. As arm member 34 is lowered, coil 70 will remain at rest on support platform 28 and support surface 90. As is further illustrated in FIG. 8C, because the housing assembly 12 is now at rest against bumpers 86, pinions 66 will no longer rotate about shaft 14. Consequently, the lugs 56b on drive members 52 will move away from the pinion webs 71 and thus begin their travel around the arcuate grooves 68.

Arm member 34 will continue to drop at a rate controlled by the rotational speed of shaft 14 until the shaft has been rotated through approximately 390° (see FIG. 8D) at which point the lowermost ends of rods 30 will come into contact with suitably positioned bumpers 88 on the mill floor. When this occurs, as illustrated in greater detail in FIG. 7, arm member 34 will be fully withdrawn from coil 70 with its upper end below the surface of support surface 90.

The effect of continued clockwise shaft rotation from the 390° to the 600° position is shown in FIG. 8E. Because the arm member 34 is now fully withdrawn to its lowermost position at rest on bumpers 88, pinions 50 will no longer rotate in a clockwise direction with the result that the lugs 56a on drive members 52 will now move away from the pinion webs 62 to begin their travel around the arcuate grooves 58. At the same time, the oppositely disposed lugs 56b on drive members 52 will come into contact with the opposite faces 69 of pinion webs 71, thus establishing a drive relationship between shaft 14 and the pinions 66 which results in the guide rods 42 and the pusher plate 46 attached thereto being extended in a horizontal direction. Pusher plate 46 will immediately come into contact with the coil 70 and thus cause the coil to be laterally transferred onto the adjacent support surface 90.

Extension of the pusher mechanism will continue until shaft 14 has been rotated in a clockwise direction to the position shown in FIG. 8F (a total of 685° rotation in the clockwise direction). At this point, lateral transfer of the coil 70 onto the adjacent support surface 90 will have been completed and rotation of shaft 14 in a clockwise direction terminated.

With both down-ending and lateral transfer of the coil completed, the above operation is reversed when returning the apparatus to the coil receiving position shown in FIG. 1. This is accomplished by simply rotating shaft 14 in the opposite or counterclockwise direction. As indicated in FIG. 8G, counterclockwise rotation of shaft 14 will cause the lugs 56a and 56b on the drive members 52 to move around the arcuate grooves 58 and 68 in the adjacent pinions 50 and 66 until the pinion webs 62 are contacted as at 61 by lugs 56a (approximately 295° rotation in the counterclockwise direction). At this point, a drive connection between shaft 14 and the pinions 50 is established in a counterclockwise direction, causing the combination of guide rods 30 and arm member 34 to begin rising. Approximately another 5° of counterclockwise shaft rotation brings the lugs 56b into contact with the pinion webs 71 of pinions 66 (see FIG. 8H). Thereafter, continued clockwise rotation through approximately an additional 295° results in the guide rods 30 and the coil receiving arm 34 being returned to their uppermost position, and the guide rods 42 carrying pusher plate 46 being laterally retracted, thus placing these components in the positions illustrated in FIG. 8I. With arm member 34 fully raised and pusher plate 46 fully retracted, the final 90° of counterclockwise shaft rotation will cause the entire housing assembly 12 to be rotated back to the initial coil receiving position illustrated in FIGS. 1–3 and 8A.

Having thus described the apparatus and its movement through one complete cycle of operation, several advantages and improvements should now be apparent to those skilled in the art. For example, all movable components are carried on a single housing assembly in a manner permitting their sequential operation to be powered and controlled in response to rotation of a single driven shaft. This arrangement thus avoids the necessity of employing separate drive devices for each component. Moreover, the self-coordination of different steps such as down-ending and lateral transfer makes expensive and complicated control systems completely unnecessary.

It is our intention to cover all changes and modifications of the embodiment herein chosen for purposes of disclosure which do not depart from the spirit and scope of the invention.

What we claim is:

1. Coil handling apparatus for transferring a coil from a horizontally disposed position at a first location to vertically disposed position at a laterally adjacent second location, said apparatus comprising: an arm member positioned to receive a coil axially delivered thereon from said first location; means for moving said coil to a vertically disposed intermediate location by rotating said arm member about a transversely extending axis; a support rotatable with said arm member for supporting said coil at said intermediate location; means for axially withdrawing said arm member from the vertically disposed coil; and means for laterally transferring the coil from said intermediate location on said support to said laterally adjacent second location.

2. Coil handling apparatus comprising the combination of: a driven rotatable shaft; a housing assembly rotatably supported on said driven shaft; an arm member on said housing assembly extending laterally therefrom in a direction transverse to the rotational axis of said driven shaft, said arm member when horizontally disposed being positioned to receive a coil axially delivered thereon from a first location; means for rotating said housing about said driven shaft so as to place said arm member and the coil axially supported thereon in a vertically disposed intermediate position; a support carried by said housing assembly for supporting said coil at said intermediate position; a first gear means for controlling the rotation of said housing assembly about said driven shaft, said first gear means being additionally operative to axially withdraw said arm member from the vertically disposed coil on said support; a pusher means for transferring said vertically disposed coil in a direction transverse to the rotational axis of said driven shaft from said support to a second location disposed laterally from said housing; and, a second gear means for controlling the operation of said pusher means, said first and second gear means operative in response to rotation of said driven shaft.

3. The apparatus as claimed in claim 2 wherein said housing assembly is provided with first rod means movable axially thereon in a direction transverse to the rotational axis of said driven shaft, said arm member being attached to and movable with said first rod means.

4. The apparatus as set forth in claim 3 wherein said housing assembly is further provided with second rod means movable axially thereon in a direction transverse to the rotational axis of said driven shaft and the longitudinal axis of said first rod means, said pusher means being attached to and movable with said second rod means.

5. The apparatus as claimed in claim 3 wherein said first gear means is comprised of at least one rack on said first rod means, said rack being in meshed relationship with a pinion gear rotatably carried on said driven shaft, and operating means keyed to said driven shaft at a point adjacent said pinion gear, said means being operative to control the rotation of said pinion gear relative to driven shaft.

6. The apparatus as claimed in claim 4 wherein said second gear means is comprised of at least one rack on said second rod means, said rack being in meshed relationship with a pinion rotatably carried on said driven shaft, and operating means keyed to said driven shaft at a point adjacent said pinion gear, said means being operative to control the rotation of said pinion gear relative to said driven shaft.

7. The apparatus as claimed in claim 6 wherein each said pinions is provided with an arcuate slot, and a lug on the operating means adjacent said pinion, said lug extending laterally into said slot.

8. Apparatus for transferring a generally cylindrical coil from a horizontally disposed position at one location to a vertically disposed position at a laterally adjacent second location, said apparatus comprising the combination of: a driven rotatable shaft; a housing assembly including a support platform rotatably carried on said driven shaft; an arm member on said housing assembly, said arm member when horizontally disposed at said one location being positioned to receive a coil axially delivered thereon; means for rotating said housing assembly about said driven shaft through an angle of approximately 90°, thereby placing said arm member and the coil carried thereon in a vertically disposed intermediate position at rest on said platform; means operating in response to rotation of said driven shaft for axially withdrawing said arm member from said coil; and means also operating in response to rotation of said driven shaft for laterally transferring said coil from said support platform to said laterally adjacent second location.

References Cited

UNITED STATES PATENTS 2,630,931 3/1953 Douglas.
3,123,236 3/1964 Contaldo _____ 214—10

ROBERT G. SHERIDAN, *Primary Examiner.*

GERALD M. FORLENZA, *Examiner.*

F. E. WERNER, *Assistant Examiner.*